(12) United States Patent
Aubry et al.

(10) Patent No.: US 10,315,518 B2
(45) Date of Patent: Jun. 11, 2019

(54) HAPTIC FEEDBACK DEVICE FOR A MOTOR VEHICLE

(71) Applicant: DAV, Créteil (FR)

(72) Inventors: Anthony Aubry, Creteil (FR); Nour-Eddine El-Ouardi, Créteil (FR)

(73) Assignee: DAV, Créteil (FR)

( * ) Notice: Subject to any disclaimer, the term of this patent is extended or adjusted under 35 U.S.C. 154(b) by 70 days.

(21) Appl. No.: 15/527,880

(22) PCT Filed: Nov. 20, 2015

(86) PCT No.: PCT/FR2015/053165
§ 371 (c)(1),
(2) Date: May 18, 2017

(87) PCT Pub. No.: WO2016/079458
PCT Pub. Date: May 26, 2016

(65) Prior Publication Data
US 2018/0339592 A1 Nov. 29, 2018

(30) Foreign Application Priority Data

Nov. 21, 2014 (FR) ..................... 14 02637

(51) Int. Cl.
*B60K 37/06* (2006.01)
*G06F 3/01* (2006.01)
(Continued)

(52) U.S. Cl.
CPC ............ *B60K 37/06* (2013.01); *B60K 35/00* (2013.01); *F16F 1/3732* (2013.01); *G06F 3/016* (2013.01);
(Continued)

(58) Field of Classification Search
None
See application file for complete search history.

(56) References Cited

U.S. PATENT DOCUMENTS

| 4,037,221 A * | 7/1977 | Alexander | ............. E05B 17/22 307/116 |
| 6,176,477 B1 * | 1/2001 | Takeo | ................... F16F 13/105 267/140.11 |

(Continued)

FOREIGN PATENT DOCUMENTS

WO 2012/052635 A1 4/2012

OTHER PUBLICATIONS

International Search Report issued in PCT/FR2015/053165 dated Mar. 8, 2016 (2 pages).
(Continued)

*Primary Examiner* — Curtis J King
(74) *Attorney, Agent, or Firm* — Osha Liang LLP

(57) ABSTRACT

The invention relates to a haptic feedback device (1) for a motor vehicle, comprising: a mobile part (2) including a touch-sensitive surface (6) and at least one vibratory actuator (7) for vibrating the touch-sensitive surface (6); and a stationary part (3) intended to be secured to the motor vehicle, characterized in that it comprises at least one asymmetric damping member (5; 15) disposed at least partially between the mobile part (2) and the stationary pan (3), said asymmetric damping member (5; 15) being configured such that the vibration generated by the vibratory actuator (7) is dampened more in one direction than the other.

10 Claims, 3 Drawing Sheets

(51) Int. Cl.
  *B60K 35/00* (2006.01)
  *F16F 1/373* (2006.01)
(52) U.S. Cl.
  CPC ............. *B60K 2350/1024* (2013.01); *B60K 2350/1028* (2013.01); *B60K 2350/1032* (2013.01)

(56) References Cited

U.S. PATENT DOCUMENTS

| | | | | |
|---|---|---|---|---|
| 7,355,595 | B2* | 4/2008 | Bathiche | G06F 3/016 340/4.12 |
| 7,755,607 | B2* | 7/2010 | Poupyrev | G06F 1/1626 345/156 |
| 8,248,218 | B2* | 8/2012 | Yamaya | G06F 3/03545 340/4.12 |
| 2002/0149561 | A1* | 10/2002 | Fukumoto | G01C 21/3664 345/156 |
| 2006/0125162 | A1* | 6/2006 | Tashiro | F16F 13/264 267/140.14 |
| 2006/0202399 | A1* | 9/2006 | Maeno | F16F 13/105 267/140.14 |
| 2007/0057927 | A1* | 3/2007 | Prados | B60K 35/00 345/173 |
| 2008/0024457 | A1* | 1/2008 | Fliegner | G01C 21/3652 345/173 |
| 2008/0119768 | A1* | 5/2008 | Kobayashi | B06B 1/045 601/78 |
| 2008/0210474 | A1* | 9/2008 | Lai | G06F 3/016 178/18.03 |
| 2008/0221789 | A1* | 9/2008 | Oono | G01C 21/26 701/532 |
| 2010/0192110 | A1* | 7/2010 | Carter | G06F 3/011 715/865 |
| 2010/0292706 | A1* | 11/2010 | Dutson | G06F 3/016 606/130 |
| 2011/0032091 | A1* | 2/2011 | Park | G06F 3/016 340/407.2 |
| 2011/0148608 | A1* | 6/2011 | Grant | G06F 1/1626 340/407.2 |
| 2011/0227849 | A1* | 9/2011 | Olien | G06F 3/016 345/173 |
| 2011/0260843 | A1* | 10/2011 | Woo | G06F 3/016 340/407.2 |
| 2011/0260995 | A1* | 10/2011 | Woo | G06F 3/016 345/173 |
| 2012/0038470 | A1* | 2/2012 | Kim | H04N 1/00411 340/407.2 |
| 2012/0068834 | A1* | 3/2012 | Lee | G06F 3/016 340/407.1 |
| 2012/0242462 | A1* | 9/2012 | Nagara | G06F 1/1632 340/407.1 |
| 2013/0050112 | A1* | 2/2013 | Vanhelle | B60K 37/06 345/173 |
| 2013/0100046 | A1* | 4/2013 | Chuang | G06F 3/016 345/173 |
| 2013/0211418 | A1* | 8/2013 | Lim | B06B 1/06 606/130 |
| 2013/0257776 | A1* | 10/2013 | Tissot | G05G 5/06 345/173 |
| 2013/0325385 | A1* | 12/2013 | Shin | G01C 5/06 702/94 |
| 2014/0028573 | A1* | 1/2014 | Olien | G06F 3/016 345/173 |
| 2014/0218324 | A1* | 8/2014 | Tissot | B60K 37/06 345/173 |
| 2014/0308940 | A1* | 10/2014 | Kwon | H04W 48/02 455/418 |
| 2014/0368465 | A1* | 12/2014 | Beilker | H03K 17/975 345/174 |
| 2015/0145783 | A1* | 5/2015 | Redelsheimer | G06F 3/016 345/173 |
| 2015/0199011 | A1* | 7/2015 | Fukumoto | G06F 3/016 345/173 |
| 2015/0316987 | A1* | 11/2015 | Tissot | B60K 37/06 345/173 |
| 2015/0333699 | A1* | 11/2015 | Kim | G06F 3/041 345/173 |
| 2016/0132113 | A1* | 5/2016 | Hotchkiss | G06F 3/0488 345/173 |
| 2017/0249011 | A1* | 8/2017 | Belley | B60K 37/00 |
| 2018/0239432 | A1* | 8/2018 | Hwang | G06F 3/01 |

OTHER PUBLICATIONS

Written Opinion of the International Searching Authority issued in PCT/FR2015/053165 dated Mar. 8, 2016 (6 pages).

* cited by examiner

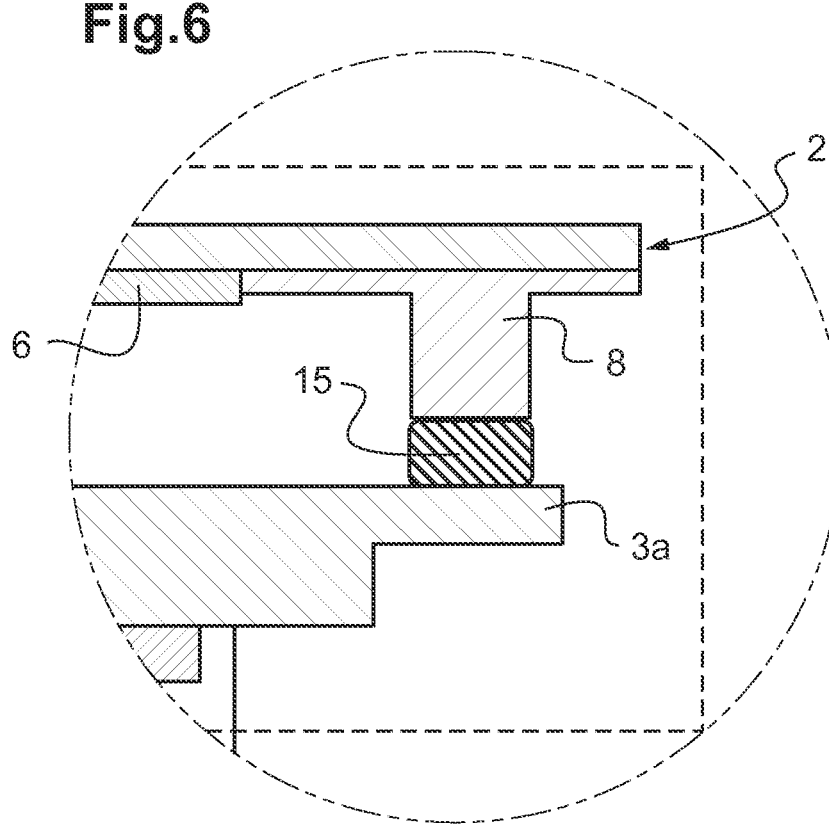

HAPTIC FEEDBACK DEVICE FOR A MOTOR VEHICLE

The present invention relates to a haptic feedback device for a motor vehicle generating a haptic feedback to the user in response to a contact on a touch-sensitive surface.

In the motor vehicle sector, the multifunction control interfaces with touch-sensitive surface are increasingly being used to control electrical or electronic systems such as an air conditioning system, an audio system or even a navigation system. Such interfaces can be associated with a display screen and allow navigation in pop-up menus comprising different commands relating to the systems to be controlled.

In order to compensate for the loss of information by mechanical feedback confirming a contact on the touch-sensitive surface to the user, the generation of a haptic feedback is provided as feedback to the user. The haptic feedback is generally obtained by the action of a vibratory actuator fixed to the touch-sensitive surface, driven to make the touch-sensitive surface vibrate in response to a contact on the surface.

A haptic feedback clearly felt by the user exhibits a significant acceleration amplitude that is rapidly damped after the first pulse. This is a so-called "strong" haptic effect. However, such haptic effects can be difficult to generate for so-called "suspended" implementations in which the mobile part comprising the actuator and the touch-sensitive surface is linked to a fixed part by a damper. It is in fact found that the oscillation of the vibration generated lasts for a relatively long time, lessening the perception quality.

One aim of the present invention is to propose a haptic feedback device for which the oscillation of the vibration generated is damped more rapidly.

To this end, the subject of the present invention is a haptic feedback device for a motor vehicle comprising:
  a mobile part comprising a touch-sensitive surface and at least one vibratory actuator for vibrating the touch-sensitive surface,
  a fixed part intended to be fixed to the motor vehicle,
  characterized in that it comprises at least one asymmetrical damping member at least partially interposed between the mobile part and the fixed part, the asymmetrical damping member being configured to damp the vibration generated by the vibratory actuator more in one direction than in the opposite direction.

An asymmetrical damping makes it possible to damp the oscillations more rapidly, which makes it possible to obtain a strong haptic effect that is better perceived by the user.

According to one or more features of the haptic feedback device, taken alone or in combination,
  the asymmetrical damping member comprises a first portion configured to damp the vibration generated by the vibratory actuator in one direction and a second portion configured to damp the vibration at least in the opposite direction,
  the haptic feedback device comprises at least one fixing member for fixing the mobile part to the fixed part through the asymmetrical damping member, the asymmetrical damping member comprising a first portion interposed between the mobile part and the fixed part and a second portion interposed between the fixed part and the head of the fixing member,
  the first portion of the asymmetrical damping member is stiffer than the second portion of the asymmetrical damping member. The asymmetrical damping member thus damps the displacement of the mobile part more toward the fixed part than toward the finger of the user. The amplitude of vibration of the touch-sensitive surface toward the finger of the user is thus less great than away from the finger, which emphasizes the feel of the user with the same energy imparted. In effect, it is found that the user has a better sensitivity to a thrust than to a depression of the finger. Moreover, by damping the vibration amplitudes more in depression mode, the loss of energy imparted to generate the oscillation toward the fixed part is limited. The use of the energy imparted to displace the mobile part is thus optimized.
  the first portion of the asymmetrical damping member has a geometrical form conferring a greater stiffness than that of the geometrical form of the second portion of the asymmetrical damping member,
  the first portion of the asymmetrical damping member has a greater thickness in the direction of the vibration than the thickness of the second portion of the asymmetrical damping member,
  the first portion of the asymmetrical damping member comprises a material exhibiting a greater stiffness than the stiffness of the material of the second portion of the asymmetrical damping member,
  the first and/or the second portion of the asymmetrical damping member has the form of a washer,
  the asymmetrical damping member comprises a central portion linking the first and the second portions,
  the asymmetrical damping member is interposed between the mobile part and the fixed part and is fixed to the mobile part and to the fixed part, the asymmetrical damping member exhibiting different damping properties in compression mode from in traction mode. That makes it possible to avoid providing, on the one hand, a second portion the asymmetrical damping member and, on the other hand, a fixing member.
  the asymmetrical damping member damps more in compression mode than in traction mode. The feel of the user is thus emphasized with the same energy imparted and the loss of energy imparted to generate the oscillation toward the fixed part is limited.
  the asymmetrical damping member is produced in a single piece,
  the vibratory actuator is configured to vibrate the touch-sensitive surface in a direction of vibration at right angles to the plane of the touch-sensitive surface.

BRIEF DESCRIPTION OF THE DRAWINGS

Other advantages and features will become apparent on reading the description of the invention, and from the attached figures which represent a nonlimiting exemplary embodiment of the invention and in which:
FIG. 6 shows a second exemplary embodiment of a haptic feedback device.

In these figures, the identical elements bear the same reference numbers.

DETAILED DESCRIPTION

Figure 1:
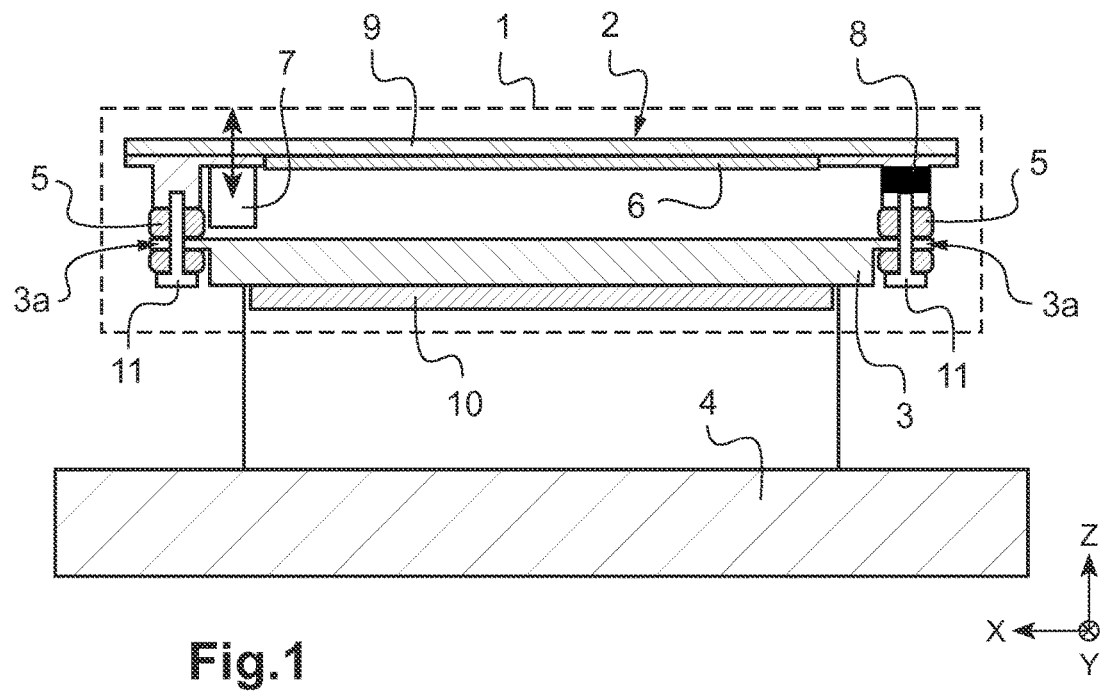
FIG. 1 represents a first exemplary embodiment of a haptic feedback device for a motor vehicle.
Figure 2:
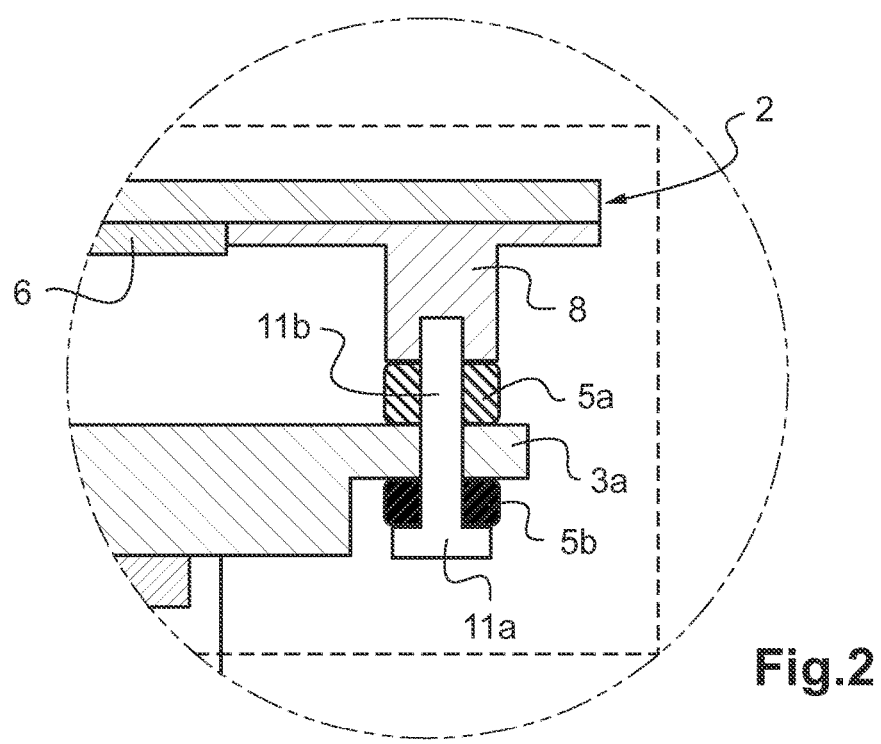
FIG. 2 represents an enlarged view of a detail of FIG. 1.

FIGS. 1 and 2 represent a first exemplary embodiment of a haptic feedback device for a motor vehicle 1, for example arranged in a dashboard of the vehicle.

The haptic feedback device 1 comprises a mobile part 2, a fixed part 3 intended to be fixed to the motor vehicle 4 and at least one asymmetrical damping member 5 at least partially interposed between the mobile part 2 and the fixed part 3, to link the mobile part 2 to the fixed part 3.

More specifically, the haptic feedback device 1 comprises, for example, two asymmetrical damping members 5, arranged under opposite edges of the mobile part 2.

The mobile part 2 comprises a touch-sensitive surface 6, at least one vibratory actuator 7 for vibrating the touch-sensitive surface 6, for example in a direction of vibration Z at right angles to the plane X, Y of the touch-sensitive surface 6 and a support 8, bearing the touch-sensitive surface 6 and to which the vibratory actuator 7 is fixed, the mobile part 2 comprising the vibratory actuator 7, defining a so-called "suspended" type architecture.

The touch-sensitive surface 6 is for example a planar surface. It comprises a sensor, such as resistive or capacitive, for detecting a contact of a user on the surface and determining the position of the contact. The touch-sensitive surface 6 notably allows a user to select, activate or validate a function, such as a function of the air conditioning, navigation, or the car radio system or to scroll through and select a choice from a list, such as a telephone list. The touch-sensitive surface 6 is for example associated with a display screen to form a touch-sensitive screen and allow a navigation in pop-up menus comprising different commands relating to the systems to be controlled.

The vibration of the touch-sensitive surface 6 makes it possible to provide the user with haptic feedback in response to a contact, such as a press or a rotation or a linear displacement etc. by his or her finger or any other activation means (for example a stylus). The feedback is called "haptic", as it can be felt by touching the touch-sensitive surface 6.

The support 8 and the touch-sensitive surface 6 are for example covered with a decorative film or a glass sheet 9 that can bear decorative patterns.

The vibratory actuator 7 is for example of ERM (Eccentric Rotating-Mass) type, also called "vibrating motor" or flyweight motor. According to another example, the vibratory actuator 7 is of electromagnetic type. It relies for example on a technology similar to that of the loudspeaker (voice coil technology). The vibratory actuator 7 is for example an LRA (Linear Resonant Actuator), also called "linear motor". The mobile part is for example formed by a mobile magnet sliding inside a fixed coil or by a mobile coil sliding around a fixed magnet, the mobile part and the fixed part cooperating by electromagnetic effect. According to another example, the vibratory actuator 7 is of piezoelectric type.

The fixed part 3 can bear an electronic circuit board 10 such as a PCB, or "printed circuit board", for example bearing a backlighting device, a vibration sensor and electronic tracks, notably linking the sensor of the touch-sensitive surface 6 and the vibratory actuator 7 to a control and power supply unit.

The asymmetrical damping member 5 is configured to damp the vibration generated by the vibratory actuator 7 more in one direction than in the other direction of the direction of vibration Z.

An asymmetrical damping makes it possible to damp the oscillations more rapidly, which makes it possible to obtain a strong haptic effect better perceived by the user.

The asymmetrical damping member 5 comprises, for example, a spring or a block of flexible material, such as rubber, also called "silent block" or a combination of these elements.

According to a first exemplary embodiment that can be seen better in FIG. 2, the asymmetrical damping member 5 comprises a first portion 5a configured to damp the vibration generated by the vibratory actuator 7 in one direction and second portion 5b configured to damp the vibration at least in the opposite direction.

The haptic feedback device 1 further comprises at least one fixing member 11 for fixing the mobile part 2 to the fixed part 3 through the asymmetrical damping member 5.

The first portion 5a is interposed between the mobile part 2 and the fixed part 3 and the second portion 5b is interposed between the fixed part 3 and the head of the fixing member 11.

The fixing member is for example a screw, comprising a head 11a topping a stem 11b, for fixing the mobile part 2 to the fixed part 3 through the asymmetrical damping member 5, the end of the stem of the fixing member 11b being inserted for example into an upright of the support 8 of the mobile part 2.

The first portion 5a is interposed between the mobile part 2 and an edge of the fixed part 3a and the second portion 5b is interposed between the fixed part 3 and the head of the fixing member 11a. The mobile part 2, the first portion 5a, the fixed part 3, the second portion 5b and the head of the fixing member 11a are aligned in the direction of the vibration Z with the stem of the fixing member 11b. The edge of the fixed part 3a is thus sandwiched between the first and the second portions of the asymmetrical damping member 5a, 5b.

Thus, in operation, when the vibratory actuator 7 vibrates the touch-sensitive surface 6, the mobile part 2 is displaced alternately in the two directions according to the direction of vibration Z. When the mobile part 2 is displaced toward the finger of the user (upward in FIG. 1), the second portion of the asymmetrical damping member 5b is compressed and acts as damper. When the mobile part 2 is displaced toward the vehicle, in depression mode (downward in FIG. 1), it is the first portion of the asymmetrical damping member 5a which is compressed and acts as damper. The first and the second portions of the asymmetrical damping member 5a, 5b thus make it possible to damp the oscillation in both directions.

The first portion of the asymmetrical damping member 5a is for example stiffer than the second portion of the asymmetrical damping member 5b. The asymmetrical damping member 5 thus damps the displacement of the mobile part 2 more toward the fixed part 3 than toward the finger of the user.

For that, the first portion of the asymmetrical damping member 5a has, for example, a geometrical form conferring a greater stiffness than that of the geometrical form of the second portion of the asymmetrical damping member 5b.

Figure 3:
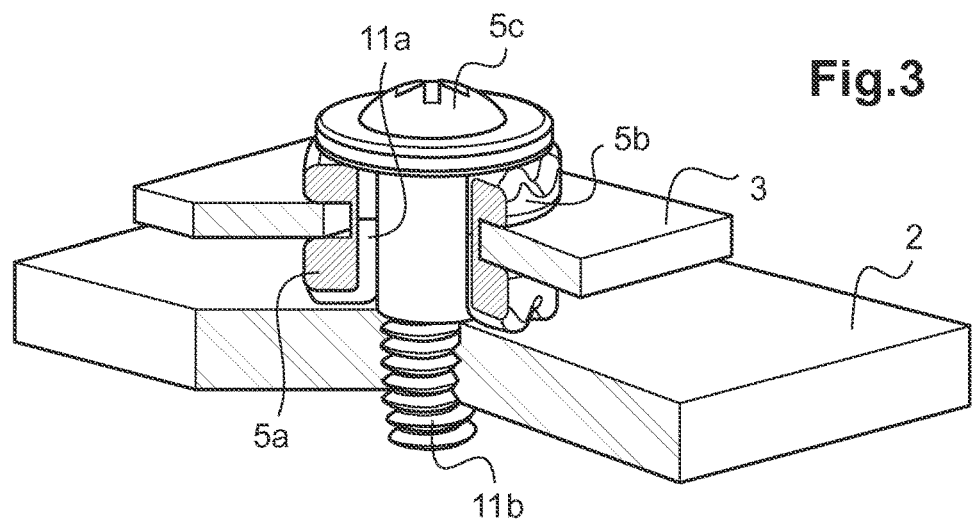
FIG. 3 represents a cross-sectional view of elements of a haptic feedback device according to the first exemplary embodiment.
Figure 4:
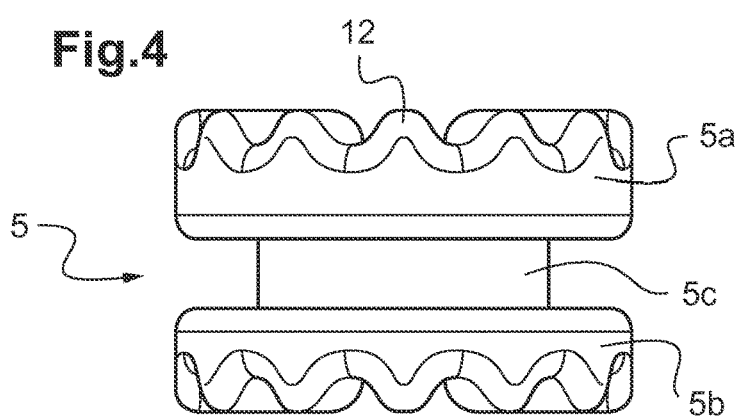
FIG. 4 represents a perspective view of the asymmetrical damping member of FIG. 3.

For example, and as better represented in FIGS. 3 and 4, the first portion of the asymmetrical damping member 5a has a greater thickness in the direction of the vibration Z than the second portion of the asymmetrical damping member 5b.

Furthermore, and as can be seen better in FIGS. 3 and 4, it is possible to provide for the first and/or the second portion of the asymmetrical damping member 5a, 5b to have the form of a washer. The washers can have wavelets 12 making it possible to modify the stiffness of the asymmetrical damping member 5 as a function of the screw-fastening of the fixing member 10.

Alternatively or in addition, the first portion of the asymmetrical damping member 5a can comprise a material exhibiting a greater stiffness than the stiffness of the material of the second portion of the asymmetrical damping member 5b.

According to a first exemplary embodiment, the first and second portions 5a, 5b are two distinct and separate elements.

Provision is for example made for the first portion 5a to be mounted free between the mobile part 2 and the fixed part 3, the first portion 5a being passed through by the stem of the fixing member 11b. The second portion 5b is fixed, for example by gluing, between the fixed part 3 and the head of the fixing member 11a. Thus, the first portion 5a works in compression mode only and the second portion 5b works in compression and traction modes.

According to another example, the first and the second portions 5a, 5b are mounted free around the stem of the fixing member 11b. The two portions 5a, 5b then work alternately in compression mode only.

It is also possible to provide, as represented in FIGS. 3 and 4, for the asymmetrical damping member 5 to include a central portion 5c between the first and the second portions 5a, 5b, surrounding the stem of the fixing member 10b and linking the first and the second portions 5a, 5b.

The asymmetrical damping member 5a, 5b, 5c is for example produced in a single piece (FIG. 4) and has a central hole for the passage of the fixing member 11. It is also possible to provide for the asymmetrical damping member 5 to over mold the fixing member 11 (not represented).

The amplitude of vibration of the touch-sensitive surface 6 toward the finger of the user is thus greater than away from the finger, which emphasizes the feel of the user with the same energy imparted. In effect, it is found that the user has a greater sensitivity to a thrust than to a depression of the finger. Moreover, by damping the vibration amplitudes more in depression mode, the loss of energy imparted to generate the oscillation toward the fixed part 3 is limited. The use of the energy imparted to displace the mobile part 2 is thus optimized.

Figure 5:
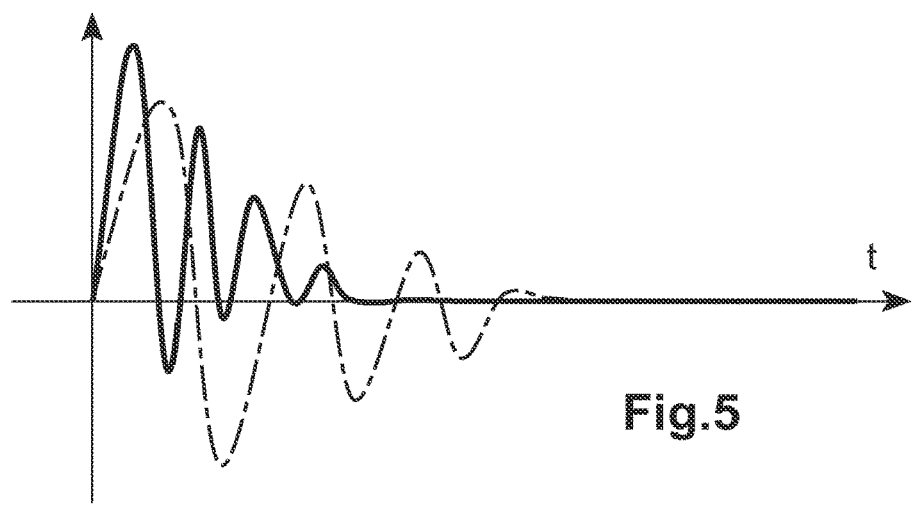
FIG. 5 shows a graph of the amplitude of the vibration in the direction of vibration as a function of time for a haptic feedback device according to the first exemplary embodiment (solid line curve) and for a system of the prior art (dotted line curve)

The graph of FIG. 5 compares the amplitude of the oscillations as a function of time in the direction of vibration Z at right angles to the plane X, Y of the touch-sensitive surface 6 for a haptic feedback device 1 provided with an asymmetrical damping member 5 (solid line curve) and for a system of the prior art provided with a standard seal (dotted line curve).

It can be seen in this graph that the number of oscillations is reduced for an asymmetrical damping member 5, the damping of the oscillation of the vibration is therefore more rapid. A shift of the curve in the direction of vibration +Z can also be observed. The haptic feedback thus exhibits a strong aspect of which the acceleration amplitude is significant and the duration is short, preferably less than 150 msec.

FIG. 6 illustrates a second embodiment.

This embodiment differs from the embodiment previously described by the fact that the asymmetrical damping member 15 is only interposed between the mobile part 2 and the fixed part 3, and exhibits different damping properties in compression mode from in traction mode. The asymmetrical damping member 15 is fixed on the one hand to the mobile part 2 and on the other hand to the fixed part 3, for example by gluing. This makes it possible to avoid providing a second portion the asymmetrical damping member 15 and providing a fixing member.

It is also possible to provide for the asymmetrical damping member 15 to damp more in compression mode than in traction mode. Thus, and as previously, the asymmetrical damping member 15 damps the displacement of the mobile part 2 toward the fixed part 3 more than toward the finger of the user. The amplitude of vibration of the touch-sensitive surface 6 toward the finger of the user is thus greater than away from it, which emphasizes the feel of the user with the same energy imparted. Moreover, by damping the vibration amplitudes more in depression mode, the loss of energy imparted to generate the oscillation toward the fixed part 3 is limited. The use of the energy imparted to displace the mobile part 2 is thus optimized.

The invention claimed is:

1. A haptic feedback device for a motor vehicle comprising:
    a mobile part comprising a touch-sensitive surface and at least one vibratory actuator for vibrating the touch-sensitive surface;
    a fixed part fixed to the motor vehicle;
    at least one asymmetrical damping member at least partially interposed between the mobile part and the fixed part,
    the at least one asymmetrical damping member being configured to damp the vibration generated by the vibratory actuator more in one direction than in a direction opposite to the one direction,
    wherein the at least one asymmetrical damping member comprises a first portion and a second portion; and
    at least one fixing member for fixing the mobile part to the fixed part through the at least one asymmetrical damping member,
    wherein the first portion of the at least one asymmetrical damping member is interposed between the mobile part and the fixed part, and
    wherein the second portion of the at least one asymmetrical damping member is fixed between the fixed part and a head of the fixing member.

2. The haptic feedback device as claimed in claim 1, wherein the asymmetrical damping member comprises the first portion configured to damp the vibration generated by the vibratory actuator in one direction and the second portion configured to damp the vibration at least in the opposite direction.

3. The haptic feedback device as claimed in claim 2, wherein the first portion of the asymmetrical damping member is stiffer than the second portion of the asymmetrical damping member.

4. The haptic feedback device as claimed in claim 2, wherein the first portion of the asymmetrical damping member has a geometrical form conferring a greater stiffness than that of a geometrical form of the second portion of the asymmetrical damping member.

5. The haptic feedback device as claimed in claim 2, wherein the first portion of the asymmetrical damping member has a greater thickness in the direction of the vibration than a thickness of the second portion of the asymmetrical damping member.

6. The haptic feedback device as claimed in claim 2, wherein the first portion of the asymmetrical damping member comprises a material exhibiting a greater stiffness than a stiffness of the material of the second portion of the asymmetrical damping member.

7. The haptic feedback device as claimed in claim 2, wherein the first and/or the second portion of the asymmetrical damping member has the form of a washer.

8. The haptic feedback device as claimed in claim 2, wherein the asymmetrical damping member comprises a central portion linking the first and the second portions.

9. The haptic feedback device as claimed in claim 1, wherein the asymmetrical damping member is produced in a single piece.

10. The haptic feedback device as claimed in claim 1, wherein the vibratory actuator is configured to vibrate the touch-sensitive surface in a direction of vibration at right angles to the plane of the touch-sensitive surface.

* * * * *